(12) United States Patent
Myers et al.

(10) Patent No.: US 9,048,647 B2
(45) Date of Patent: Jun. 2, 2015

(54) MAGNETIC WALL COVER SYSTEM

(71) Applicant: Belwith Products, LLC, Grandville, MI (US)

(72) Inventors: Gary L. Myers, Monee, IL (US); Michael Aaron Cohen, Buffalo Grove, IL (US); Alyssa M. Nelson, Crown Point, IN (US)

(73) Assignee: Belwith Products, LLC, Grandville, MI (US)

( * ) Notice: Subject to any disclaimer, the term of this patent is extended or adjusted under 35 U.S.C. 154(b) by 75 days.

(21) Appl. No.: 13/966,911

(22) Filed: Aug. 14, 2013

(65) Prior Publication Data

US 2014/0048303 A1    Feb. 20, 2014

Related U.S. Application Data

(60) Provisional application No. 61/683,344, filed on Aug. 15, 2012.

(51) Int. Cl.
*H05K 5/03* (2006.01)
*H02G 3/14* (2006.01)

(52) U.S. Cl.
CPC .............. *H02G 3/14* (2013.01); *Y10T 29/49826* (2015.01)

(58) Field of Classification Search
USPC ................ 174/66, 67; 220/241, 242; 439/536
See application file for complete search history.

(56) References Cited

U.S. PATENT DOCUMENTS

| | | | |
|---|---|---|---|
| 2,573,260 A | 10/1951 | Gorman | |
| D246,571 S | 12/1977 | Grieb | |
| 4,803,380 A * | 2/1989 | Jacoby et al. | 307/157 |
| 6,150,609 A * | 11/2000 | Baldwin | 174/66 |
| 7,214,898 B1 | 5/2007 | Margareten | |
| 8,148,637 B2 | 4/2012 | Davidson | |
| 8,209,921 B2 * | 7/2012 | Struthers et al. | 52/204.1 |
| 8,901,421 B2 * | 12/2014 | Texter | 174/66 |
| 2009/0020307 A1 | 1/2009 | Roach | |

OTHER PUBLICATIONS

Columbia Gorge Stoneworks, Inc., "Magnetic switch plates," retrieved from www.stonewallplates.com/mag_switchplates.html on Apr. 30, 2012.

* cited by examiner

*Primary Examiner* — Dhirubhai R Patel
(74) *Attorney, Agent, or Firm* — Leydig, Voit & Mayer, Ltd.

(57) ABSTRACT

A magnetic wall cover system that includes an inner cover made at least partially of a ferrous material. The inner cover has an outer alignment surface. The magnetic wall cover system also has an outer cover that has an inner alignment surface. The outer cover is adapted to be removably mounted on the inner cover such that the inner alignment surface is in engaging relationship to the outer alignment surface when the outer cover is mounted over the inner cover. The magnetic wall cover system also includes at least one magnet disposed on the outer cover. The magnet is adapted to form a magnetic attraction between the magnet and the ferrous material of the inner cover.

15 Claims, 14 Drawing Sheets ively on the inner cover. The magnetic wall cover system can also have at
MAGNETIC WALL COVER SYSTEM

CROSS-REFERENCE TO RELATED APPLICATIONS

This patent application claims the benefit of U.S. Provisional Patent Application No. 61/683,344, filed Aug. 15, 2012, which is incorporated by reference.

BACKGROUND OF THE INVENTION

Almost any inhabited space, including in homes, offices, or commercial areas, walls and other fixtures will include light switches, electrical switches, electrical plugs, and many other implements. These implements often interrupt the decorative features of the space and, therefore, covers are used in an attempt to have the implement blend in with the decorative nature of the space or otherwise cover the implement. In the past, wall covers have been at least quasi-permanent fixtures on the wall, attached by visible screws or other fasteners that require tools to install and remove them. When a room is to be redecorated or repainted, the wall covers must be unfastened through sometimes tedious work and either replaced or reinstalled.

Previous efforts have been made to create wall covers that can be manually removable and avoid visible screws on the outer surface. Such covers typically made of molded plastics are two part with the outer cover snap fitting to an inner plate. Others have attempted to provide an outer decoration wall cover which has magnets positioned to attach to screws that hold the electrical device to an electrical box or an inner cover, such as in U.S. Publication No. 2009/0020307. An easily installable and removable wall cover that may be decorative or architectural is needed which offers the user flexibility in application and allows for firm attachment without being easily knocked off or misaligned.

BRIEF SUMMARY OF THE INVENTION

The disclosure describes, in one aspect, a magnetic wall cover system that can include an outer decorative cover assembly and an inner fire retention cover. The inner cover can be made at least partially of ferrous materials and have an outer alignment surface. The outer cover can have an inner alignment surface. The outer cover can be adapted to be removably mounted on the inner cover such that the inner alignment surface is in engaging relationship to the outer alignment surface when the outer cover is mounted over the inner cover. The magnetic wall cover system can also have at least one magnet disposed on the outer cover. The magnet can be adapted to form a magnetic attraction between the magnet and the ferrous material of the inner cover. The outer cover can be mounted such that it can be installed and removed without the use of tools or fasteners other than magnets.

The disclosure describes, in another aspect, a magnetic wall cover system that includes an inner cover and an outer cover. The inner cover can be made at least partially of ferrous material. The inner cover can form an inner cover implement cavity that is adapted to provide access to an implement having a protrusion. The outer cover can form an outer cover implement cavity that is adapted to provide access to the implement. The outer cover is removably mountable to the inner cover such that the protrusion of the implement can nest within an alignment recess adjacent the outer cover implement cavity when the outer cover is mounted over the inner cover. The magnetic wall cover also includes at least one magnet disposed on the outer cover. The magnet can be adapted to form a magnetic attraction between the magnet and the ferrous material of the inner cover.

The disclosure describes, in another aspect, a method of using a magnetic wall cover system. The method involves providing an inner cover made at least partially of a ferrous material. The inner cover can define an outer alignment surface. The method includes providing an outer cover that can define an inner alignment surface, and involves connecting at least one magnet to the outer cover. The method can also involve mounting the inner cover to a mounting surface, and mounting the outer cover over the inner cover such that the outer alignment surface engages with the inner alignment surface. The outer cover can be mounted over the inner cover such that a magnetic attraction is established between the ferrous portions of the inner cover and the at least one magnet.

DETAILED DESCRIPTION OF THE DRAWINGS

Figure 1:
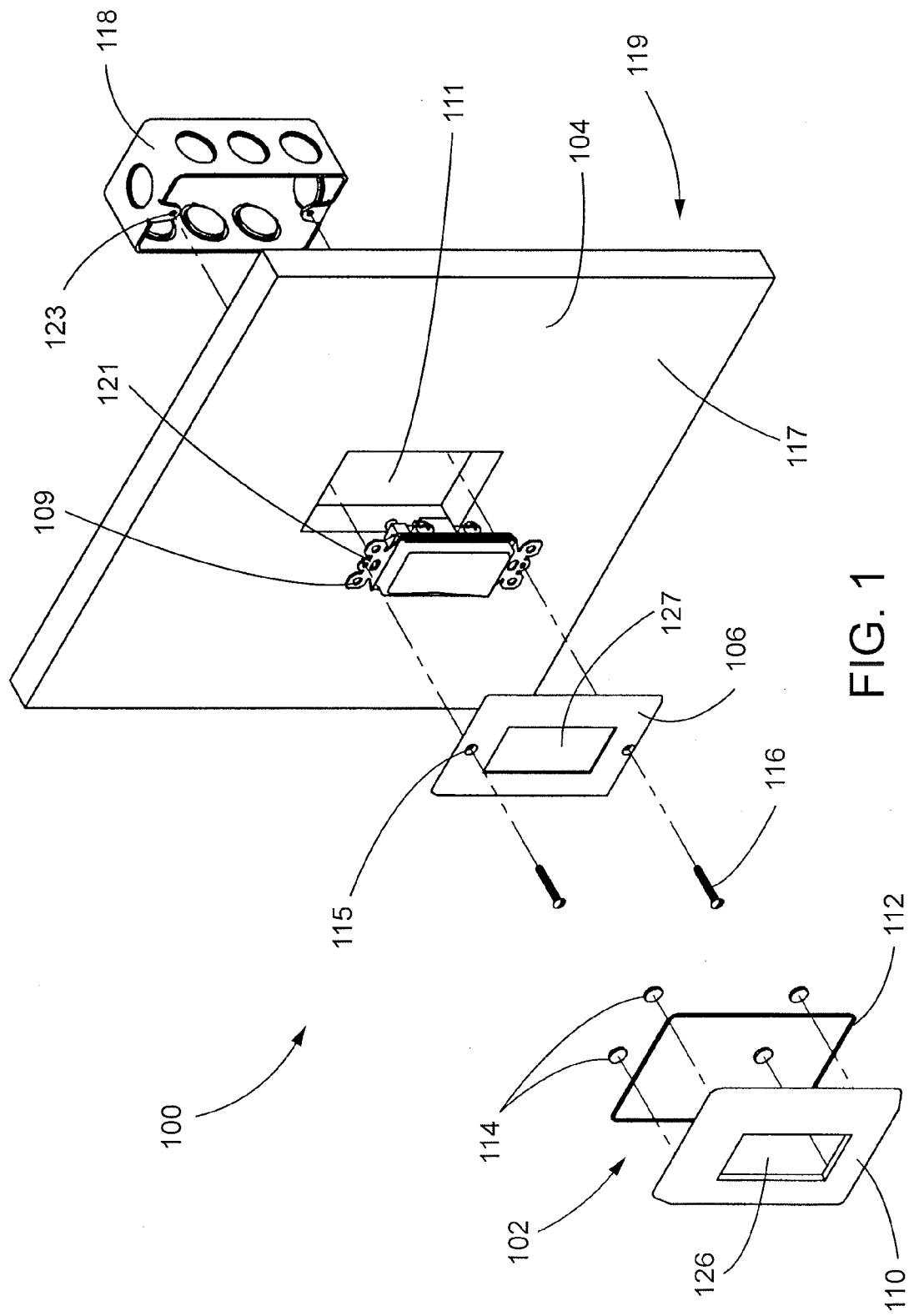
FIG. 1 is an exploded view of a magnetic wall cover system in accordance with the disclosure.

This disclosure relates to a magnetic wall cover system and methods for providing a protective and/or decorative wall cover for various types of implements, such as electrical switches, electric plug connectors, cable connectors, modular plug connectors, or any other type of implement installed in a wall, floor, ceiling, or other fixture. An embodiment of a magnetic wall cover system 100 is illustrated in FIG. 1. Although the magnetic wall cover system 100 is shown as mounted to a wall 104, the wall could be any other type of fixture on which an implement can be mounted. As illustrated, the magnetic wall cover system 100 includes an outer cover assembly 102, an inner cover or plate 106, and an implement 108. The outer cover assembly 102 can include an outer cover 110, an outer cover seal 112, and a plurality of magnets 114. In some embodiments, the magnets 114 can be rare earth super strong Neodymium material in a coin shape which are available inexpensively and provide strong holding power. In the illustrated embodiment of the magnetic wall cover system 100, the implement 108 is shown as an electrical switch, but it is contemplated that any type of mounted implement can be used. The inner plate 106 is can be made of ferrous material and can provide UL and/or code fire containment requirements.

As shown in FIG. 1, the implement 108 can be mounted into the wall 104 or any other fixture at a mounting cavity 111. The illustrated implement 108 has a mounting bracket 109, which can be fastened to the inner cover 106 and a mounting box 118. Portions of the mounting bracket 109 abut the front 117 of the wall 104 adjacent them mounting cavity 111, while portions of the mounting box 118 about the back 119 of the wall adjacent the mounting cavity. The inner cover 106, the mounting bracket 109, and the mounting box 118 include fastener holes 115, 121, 123, respectively, through which fasteners 116 can fit to fasten the parts to one another. Although FIG. 1 illustrates an embodiment using fasteners 116 that pass through the inner cover 106, the mounting bracket 109, and the mounting box 118, it is contemplated that separate sets of fasteners can fasten the mounting box 118 to the mounting bracket 109 and the mounting bracket to the inner cover 106, or that other known configurations for mounting the implement 108 to the wall 104 can be utilized. Although not illustrated, it is contemplated that an inner cover seal can be disposed between the inner cover 106 and the wall 104 to provide a sealing engagement between the wall and the inner cover, as well as prevent damage to the wall adjacent the inner cover.

Figure 2:
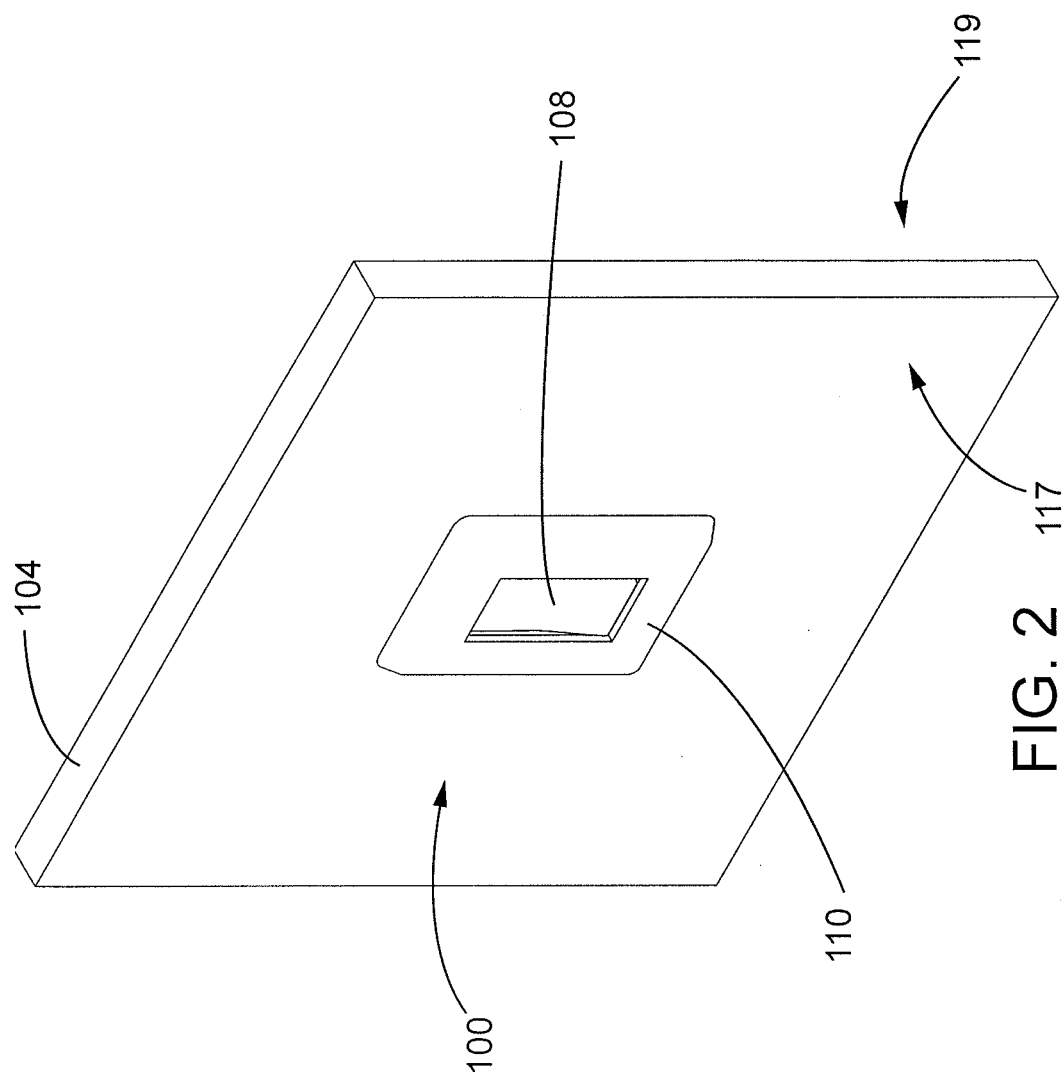
FIG. 2 is a perspective view of the magnetic wall cover system of FIG. 1 installed on a mounting surface.

The inner cover 106 forms an inner cover implement cavity 127 and can be made of any ferrous material suitable for magnetic attraction. When installed, the inner cover 106 can cover at least a portion of the mounting bracket 109 and can abut the wall adjacent the mounting cavity 111, but can allow at least a portion of the implement 108 accessible through the inner cover implement cavity 127. When installed, the outer cover assembly 102 can cover the inner cover 106 and can be held in place by magnets 114. The outer cover 110 can have an outer cover implement cavity 126 to allow access to the implement 108 when the outer cover assembly 102 is mounted against the inner cover 106. FIG. 2 illustrates the magnetic wall cover system 100 installed on the wall 104. As shown, when installed, the only visible features of the magnetic wall cover assembly 100 can be a portion of the implement 108 and the outer cover 110, though additional configurations are contemplated.

Figure 3:
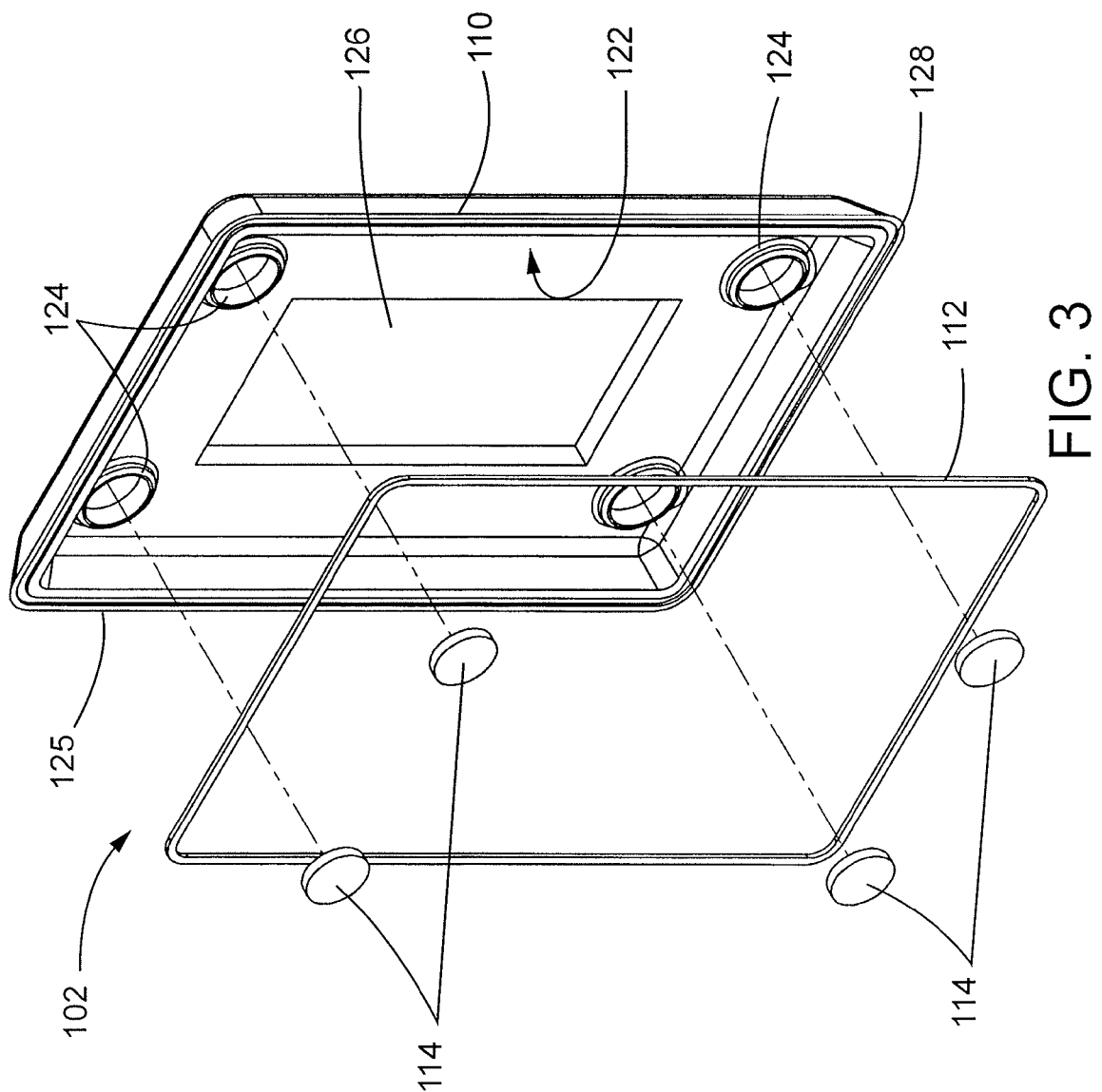
FIG. 3 is an exploded view of an outer cover assembly of the magnetic wall cover system of FIG. 1.

FIG. 3 illustrates an embodiment of the outer cover assembly 102, including the outer cover 110, the outer cover seal 112, and magnets 114. The outer cover 110 may be decorative such as an architectural cast cover. The inner portion 122 of the outer cover 110 can include a plurality of magnet retainers 124. The magnet retainers 124 can be shaped to accept the magnets 114 and prevent the magnets from moving. The magnet retainers 124 can be integral with the outer cover 110, adhered to the outer cover with an adhesive, or mounted in any other suitable manner. The magnets 114 can fit into the magnet retainers 124 and can be adhered to the inner portion 122 of the outer cover 110 within the magnet retainers. Although FIG. 3 illustrates an embodiment with four magnets 114, any number of magnets and corresponding magnet retainers 124 are contemplated. Alternatively, it is contemplated that some embodiments may not include magnet retainers 124, and in such embodiments, the magnets 114 can be adhered directly to the inner portion 122 of the outer cover 110. Additionally, although the figures illustrate circular magnets 114 and magnet retainers 124, any other shapes of magnets and corresponding magnet retainers are contemplated as well. Many types of magnetic materials are suitable for the magnets 114. For example, the magnets 114 can be made from Neodymium. Magnets made from Neodymium 30H to Neodymium 45 with a Gauss rate between 11,000 to 13,500 can be used or, more particularly magnets made from Neodymium 42 can be used.

Figure 12:
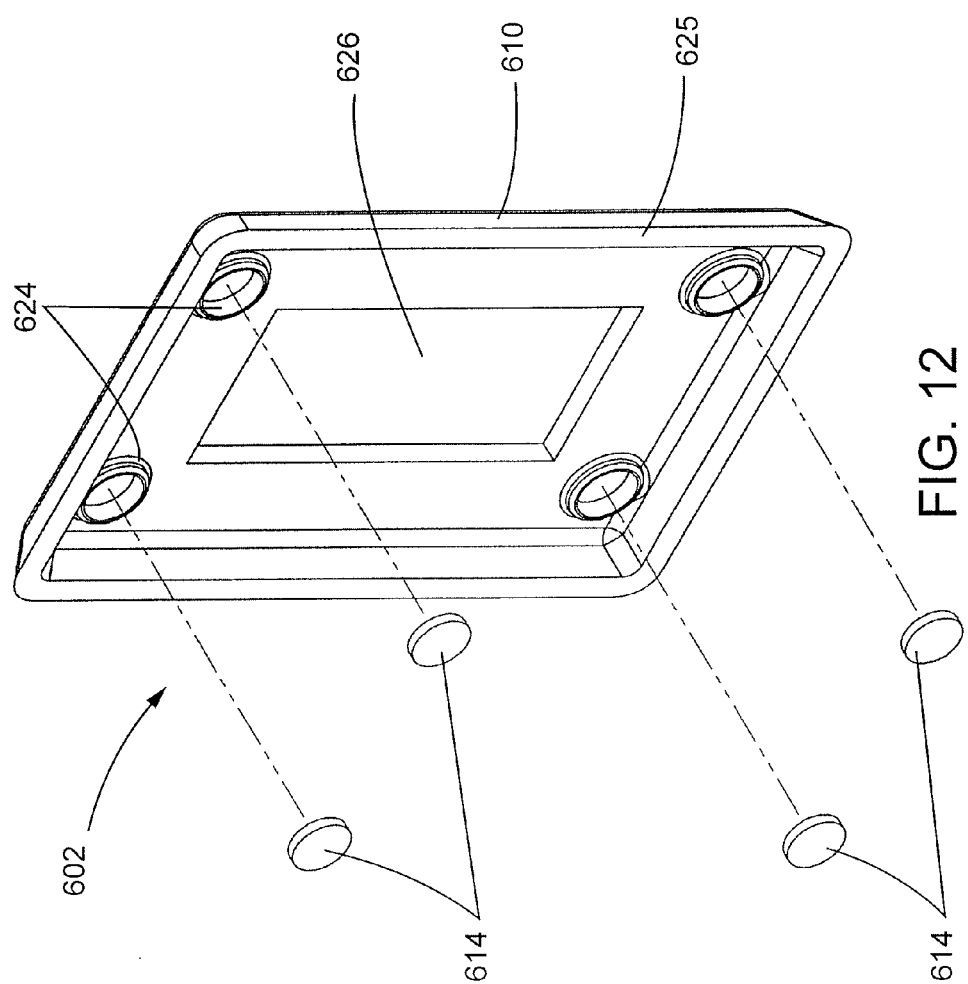
FIG. 12 is an exploded view of another alternative embodiment of an outer cover assembly in accordance with the disclosure.

The illustrated outer cover 110 can also include a seal channel 128 that can be recessed into a rim 125 of the outer cover. The rim 125 substantially defines the perimeter of the outer cover 110 on the portion of the outer cover that is adapted to engage with a mounting surface 100. The outer cover seal 112 can fit into the seal channel 128 on the rim 125 such that at least a portion of the seal can protrude over the rim. The outer cover seal 112 can be adhered, press fit, or otherwise secured into the seal channel 128. As shown, the outer cover seal 112 is one continuous piece, but it is contemplated that the outer cover seal can be made of multiple pieces that are all seated either spacingly or adjacently into the seal channel 128. It is also contemplated that certain embodiments of the outer cover assembly may not include a seal or a seal channel. Such an embodiment is illustrated in FIG. 12.

Figure 4:
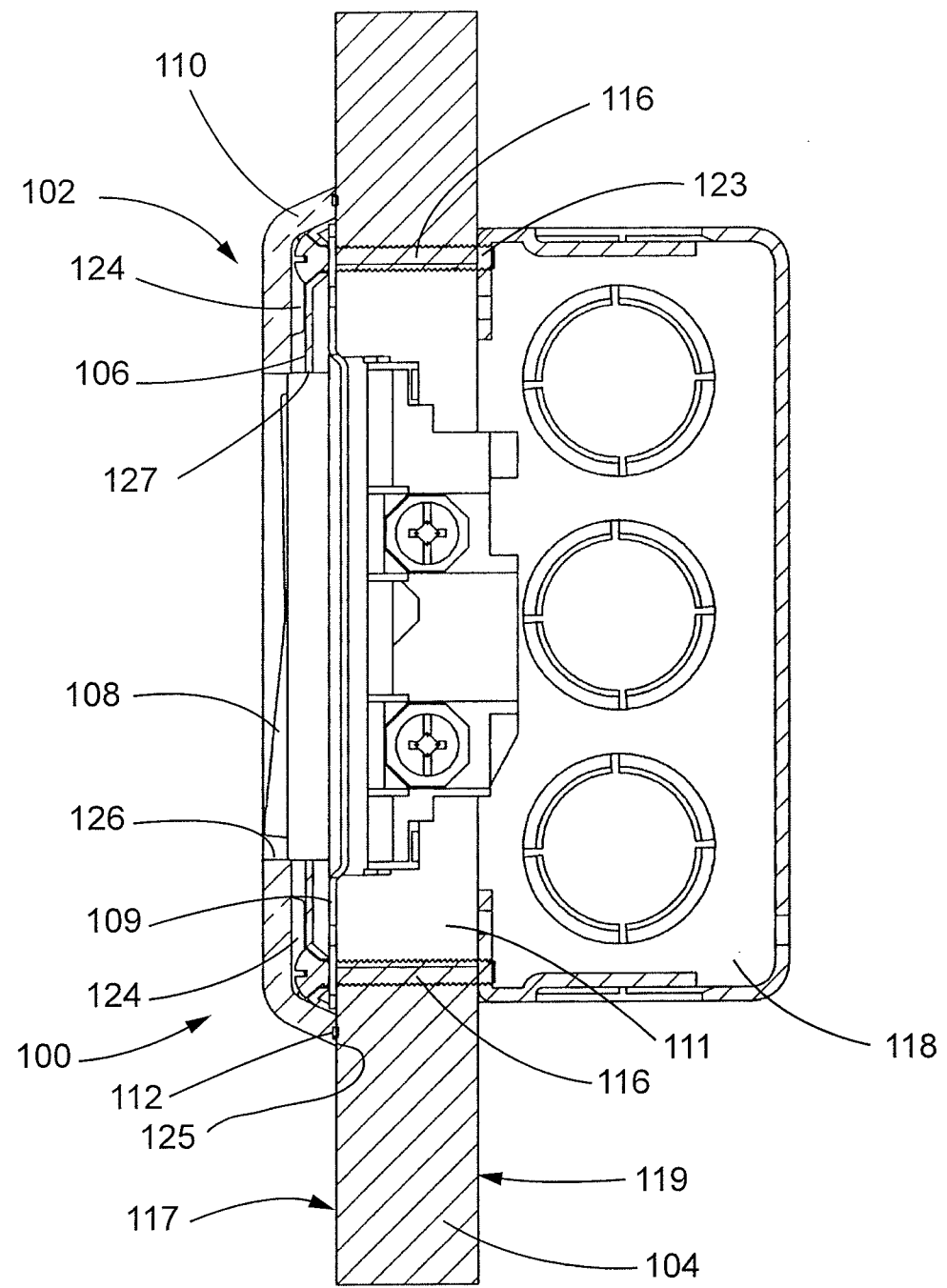
FIG. 4 is a cross-sectional view of the magnetic wall cover system of FIG. 1 installed on a mounting surface.

FIG. 4 illustrates a sectional view of the magnetic wall cover system 100 installed over the implement 108 in the wall 104. As shown, the inner cover 106 is positioned over the mounting bracket 109 of the implement 108 such that the implement is accessible through the inner cover implement cavity 127. In the illustrated embodiment, fasteners 116 can connect the inner cover 106 and the mounting bracket 109 to the mounting box 118 through the wall 104 at the mounting cavity 111. The outer cover 110 can be positioned over the inner cover 106 such that the implement 108 is accessible through the outer cover implement cavity 126. FIG. 4 shows the magnet retainers 124 positioned against the inner cover 106 such that the magnetic field created by the magnets 114 can pull the outer cover 110 toward the ferrous inner cover and hold the outer cover in place. Because the inner cover 106 can be made from a ferrous material, the magnets 114 can establish attraction with the inner cover at any point, making precise positioning of the magnets with respect to the inner cover unnecessary. In the illustrated embodiment, the rim 125 of the outer cover 110 can press the outer cover seal 112 against the wall 104 surrounding the mounting cavity 111 and the magnets 114 and magnet retainers 124 can abut the inner cover 106. When the outer cover seal 112 is pressed against the wall 104, the seal can help limit dust, dirt, or other debris from entering the outer cover 110. Additionally, the outer cover seal 112 can be made of a soft or flexible material that can help limit damage to the wall 104 from scratching by the outer cover 110. In certain embodiments, however, it is contemplated that the outer cover assembly 102 is shaped such that the rim 125 of the outer cover 110 will not abut the wall 104. It is also contemplated that, in some embodiments, the magnets 114 may not abut the inner cover 106 when the outer cover assembly 102 is installed over the inner cover. In such embodiments, the attractive strength of the magnetic field provided by the magnets 114 can be sufficient to hold the outer cover 110 in place over the inner cover 106 even with a gap between the magnets and the inner cover.

Figure 5:
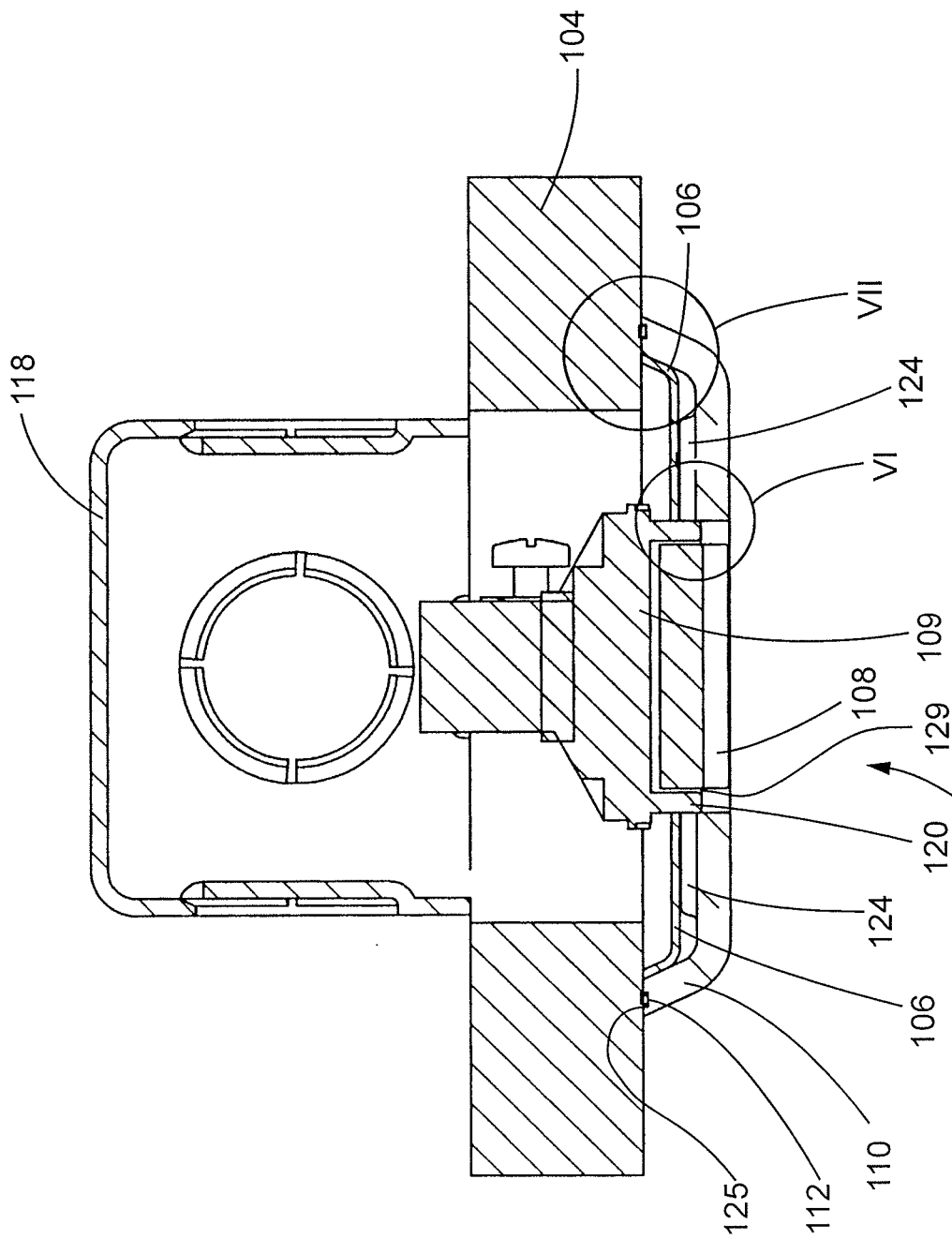
FIG. 5 is another cross-sectional view of the magnetic wall cover system of FIG. 1 installed on a mounting surface.
Figure 7:
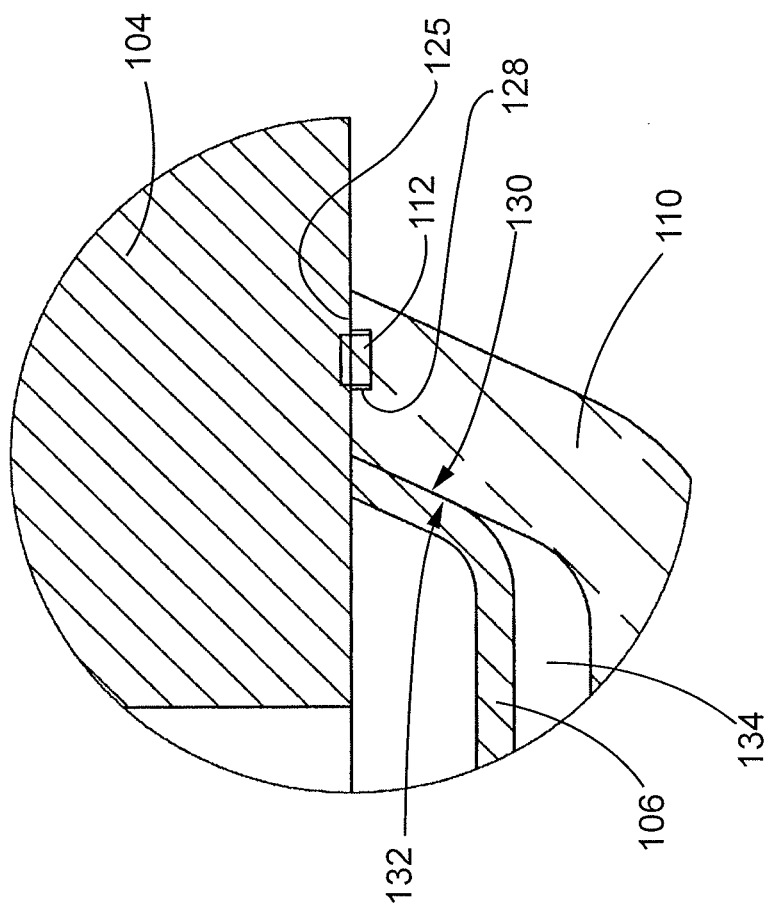
FIG. 7 is another detailed cross-sectional view of a portion of the magnetic wall cover system of FIG. 1 installed on a mounting surface.
Figure 6:
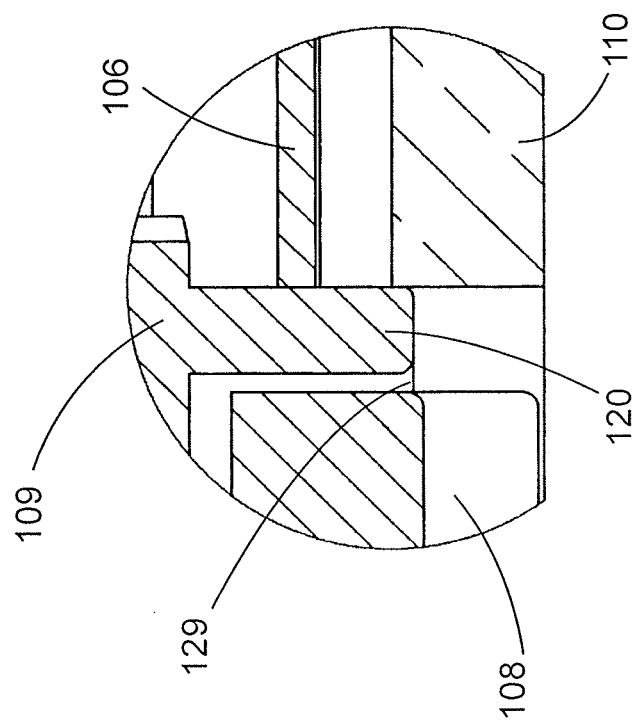
FIG. 6 is a detailed cross-sectional view of a portion of the magnetic wall cover system of FIG. 1 installed on a mounting surface.

FIG. 5 illustrates another sectional view of the magnetic wall cover system 100 mounted on the wall 104 over the implement 108. FIG. 5 also illustrates an a protrusion 120 of the mounting bracket 109 on the implement 108 that can be used to align the outer cover assembly 102. The protrusion 120 can protrude from the mounting bracket 109 at least partially surrounding the implement 108 and can abut the outer cover 110 at an alignment recess 129. The alignment recess 129 can be formed in the outer cover 110 adjacent to and at least partially surrounding the outer cover implement cavity 126 and can provide a surface against which the protrusion 120 can abut when the outer cover assembly 102 is mounted. FIG. 6 illustrates a detailed view of the protrusion 120 nested with the alignment recess 129. As shown, the protrusion 120 can protrude from the mounting bracket 109, through the inner cover implement cavity 127 between the implement 108 and the inner cover 106, and can abut against the outer cover 106 in the alignment recess in an engaging relationship. In some embodiments, the protrusion 120 can surround the entire implement 108, while in other embodiments, the protrusion 120 only partially surrounds the implement. The outer cover assembly 102 can be properly aligned with the implement 108 and the rest of the magnetic wall cover system 100 when the protrusion 120 is positioned in the alignment recess 129. FIG. 5 also shows a relief area 134 that can be formed between the inner cover 106 and the outer cover 110. The relief area 134 is also shown in FIG. 7. The relief area 134 can allow for variation in the depth of the mounting of the implement 108. As discussed above, even if the magnets 114 do not make contact with the inner cover 106, the magnetic field provided by the magnets that attracts the ferrous inner cover can be strong enough to secure the outer cover assembly 102 against the wall 104.

FIG. 5 also illustrates another mechanism to ensure proper alignment of the outer cover assembly 102, which is shown in FIG. 7 in greater detail. As shown in FIG. 7, the inner cover 106 can include an outer alignment surface 130 and the outer cover 110 can include an inner alignment surface 132. Both alignment surfaces 130, 132 can be at substantially an equal angle with respect to the wall 104 and can provide continuous surfaces around the entire inner and outer covers. When properly aligned, the inner alignment surface 132 of the outer cover 110 can be substantially flush against the outer alignment surface 130 of the inner cover 106. Since the inner alignment surface 132 and the outer alignment surface 130 can be in engaging relationship substantially around the entire perimeter of the outer cover 110, movement of the outer cover assembly 102 with respect to the inner cover 106 can be limited or eliminated. The relief area 134 can allow for variation in the depth of the mounting of the implement 108. Although the illustrated embodiment includes the protrusion 120 of the mounting bracket 109 and the inner alignment surface 132 and outer alignment surface 130, the two alignment mechanisms shown in FIG. 6 and FIG. 7 may not be present in all embodiments. FIG. 7 also shows the outer cover seal 112 seated within the seal channel 128 and engaging with the mounting surface 104. Some embodiments include only one of the alignment mechanisms, while other embodiments include neither alignment mechanism. The illustrated alignment mechanisms can limit vertical or horizontal movement of the outer cover assembly 102 resulting from vibrations introduced to the wall 104 or various other forces.

Figure 9:
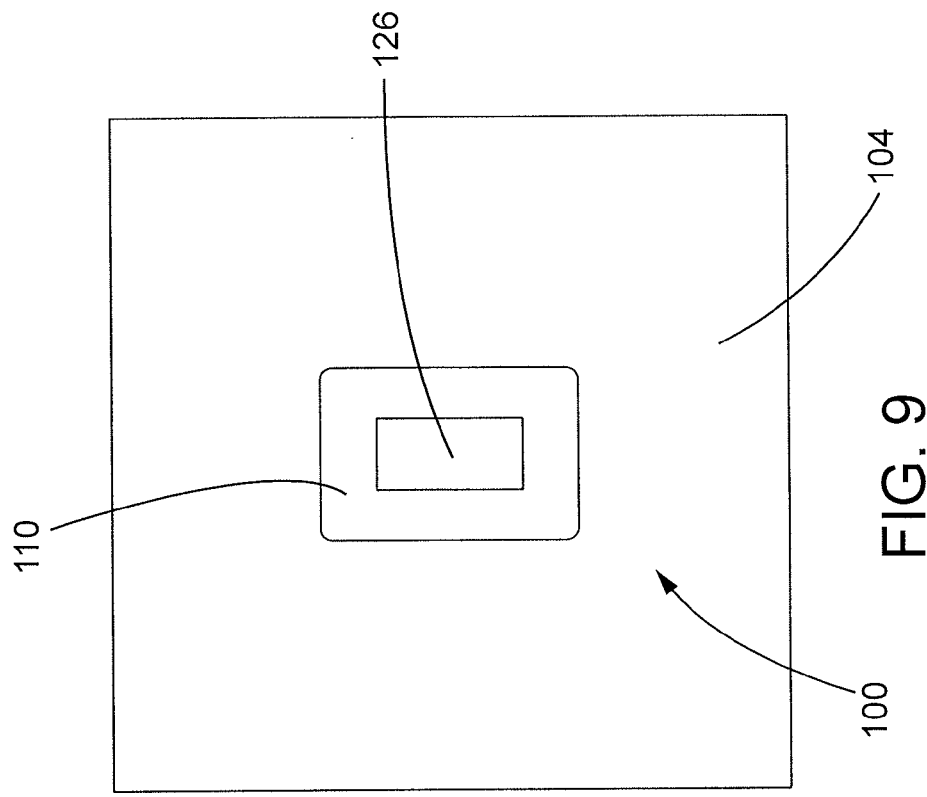
FIG. 9 is a front view of the magnetic wall cover system of FIG. 8 installed on a mounting surface.
Figure 8:
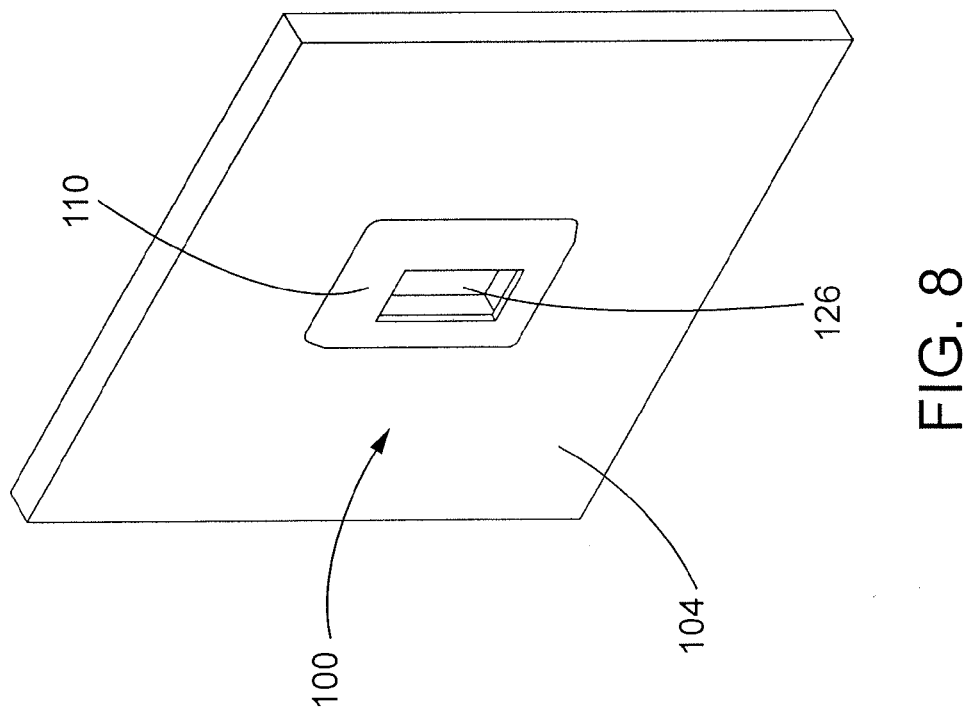
FIG. 8 is a perspective view of an embodiment of a magnetic wall cover system installed on a mounting surface in accordance with the disclosure.

FIGS. 8 and 9 illustrate the magnetic wall cover system 100 mounted on the wall 104 without an implement 108 in place. The figures show the outer cover 110 and the outer cover implement cavity 126.

Figure 10:
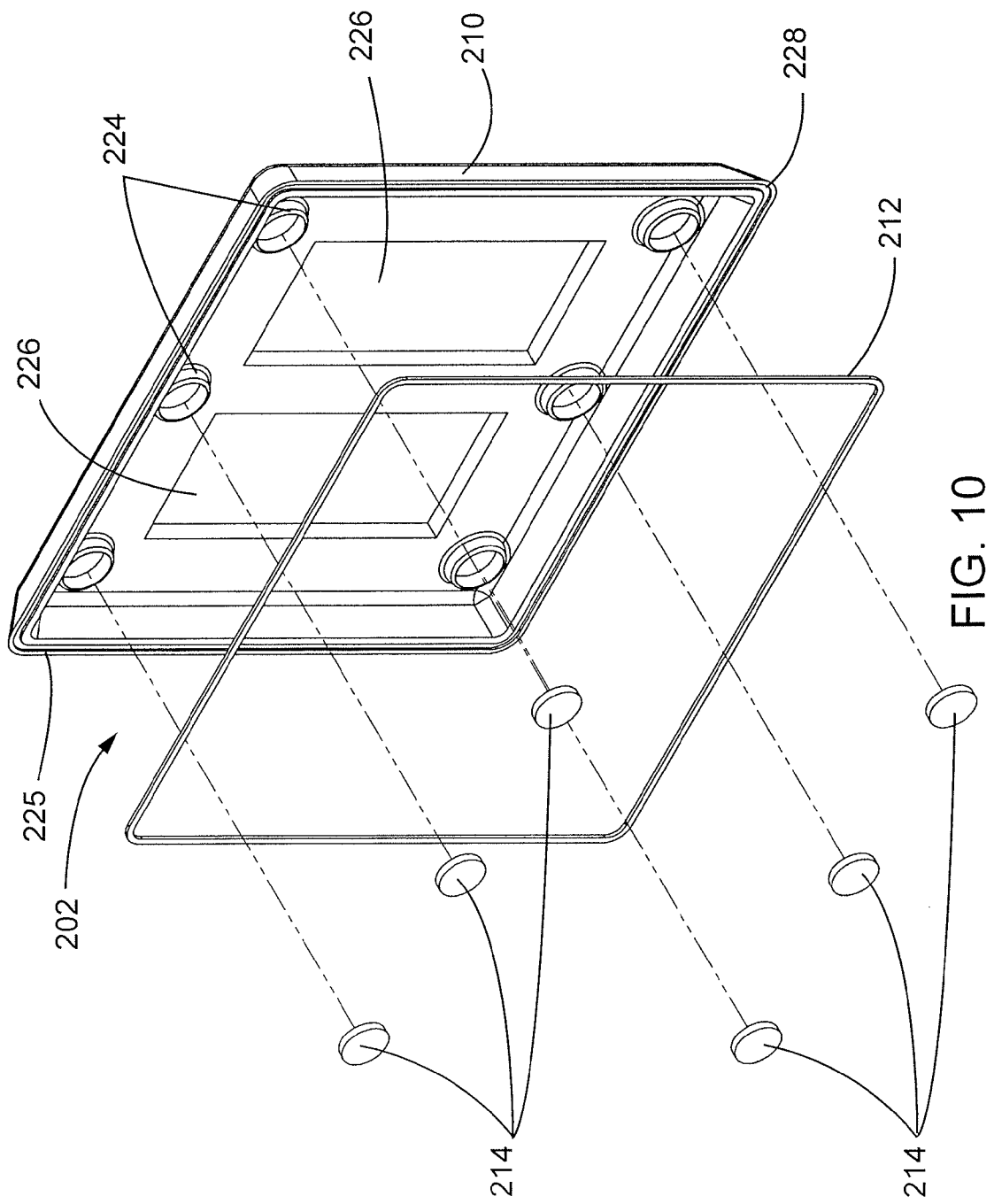
FIG. 10 is an exploded view of an alternative embodiment of an outer cover assembly in accordance with the disclosure.
Figure 11:
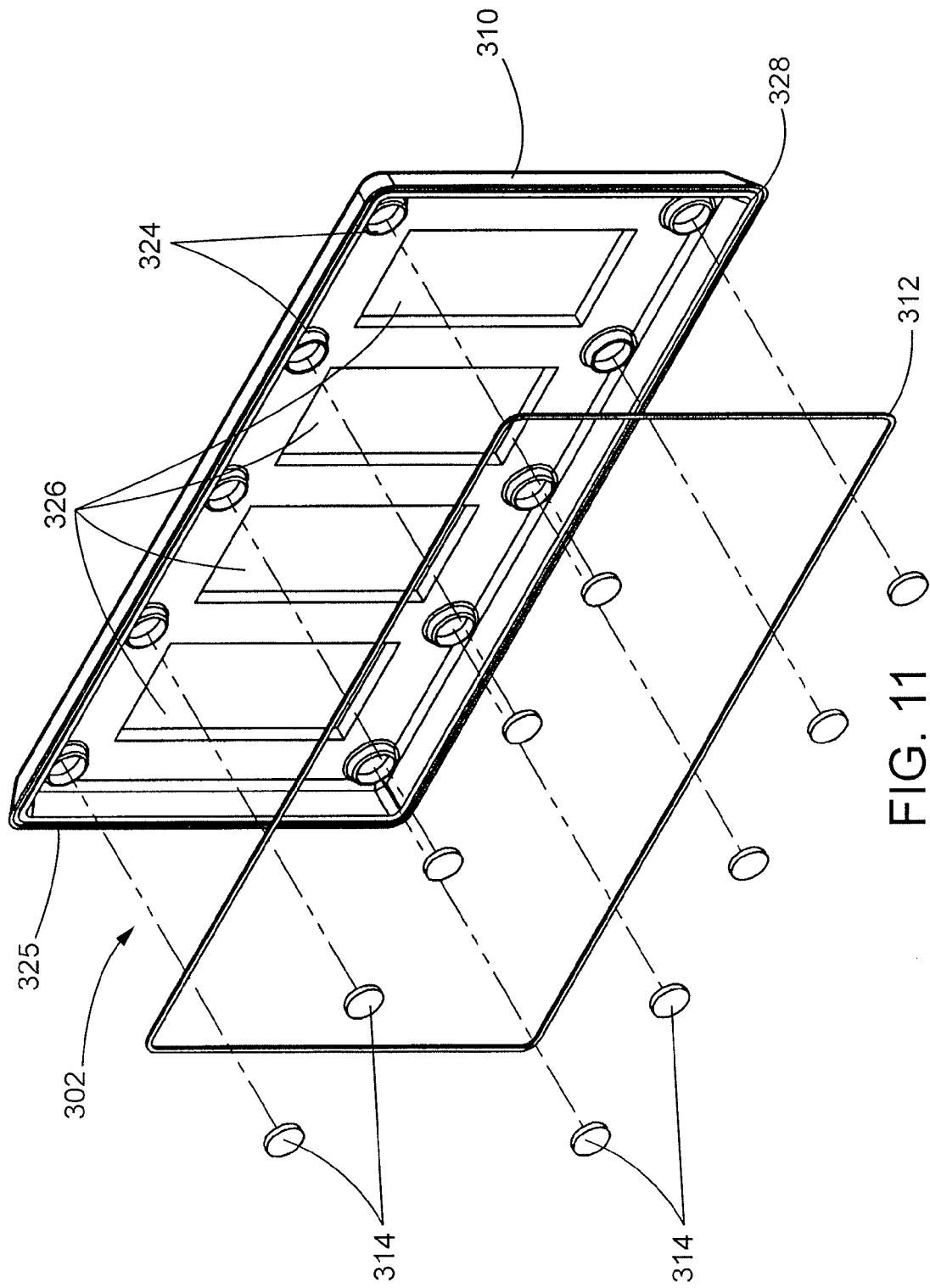
FIG. 11 is an exploded view of another alternative embodiment of an outer cover assembly in accordance with the disclosure.

FIG. 10 illustrates an alternative embodiment of an outer cover assembly 202. The embodiment shown in FIG. 10 includes two outer cover implement cavities 226 formed by the outer cover 210, which can allow access to multiple switches, electrical plugs, or other features of an implement. The outer cover assembly 202 can have an outer cover 210, an outer cover seal 212, and a plurality of magnets 214, specifically six magnets in the illustrated embodiment. The outer cover 210 can include a rim 225 with a seal channel 228 and a plurality of magnet retainers 224 that can retain the magnets 214. FIG. 11 illustrates yet another alternative embodiment of an outer cover assembly 302. The embodiment in FIG. 11 includes four outer cover implement cavities 326 formed by the outer cover 310 which can allow access to multiple switches, electrical plugs, or other features of an implement. The outer cover assembly 302 can have an outer cover 310, a outer cover seal 312, and a plurality of magnets 314, such as ten magnets in the illustrated embodiment. The outer cover 310 can include a rim 325 with a seal channel 328 and a plurality of magnet retainers 324 that retain the magnets 314. It is contemplated that, in all embodiments of the magnetic wall cover system, any number of magnets and magnet retainers can be used, and that any number of outer cover implement cavities can be used to correspond with the implement being covered.

Figure 13:
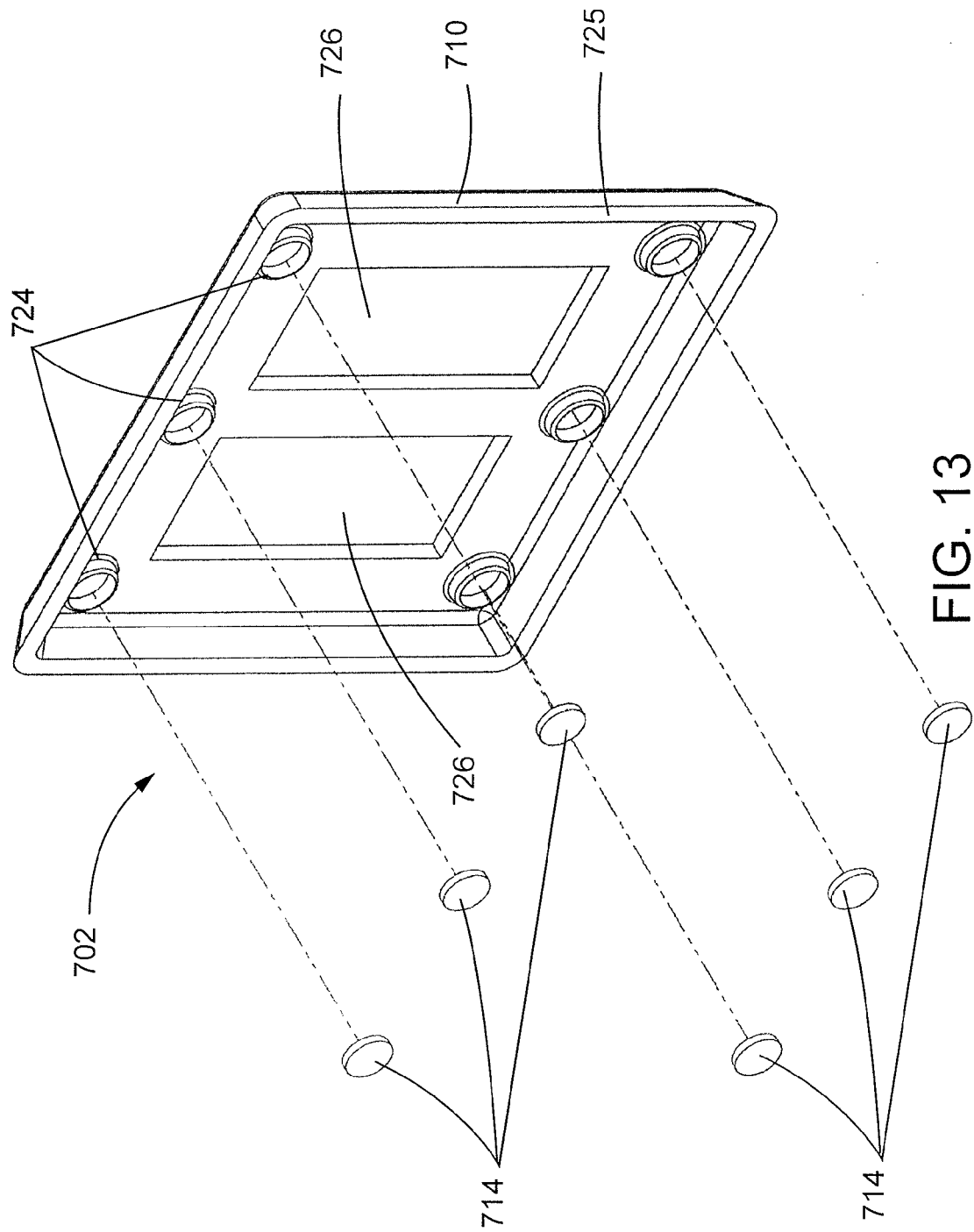
FIG. 13 is an exploded view of another alternative embodiment of an outer cover assembly in accordance with the disclosure.
Figure 14:
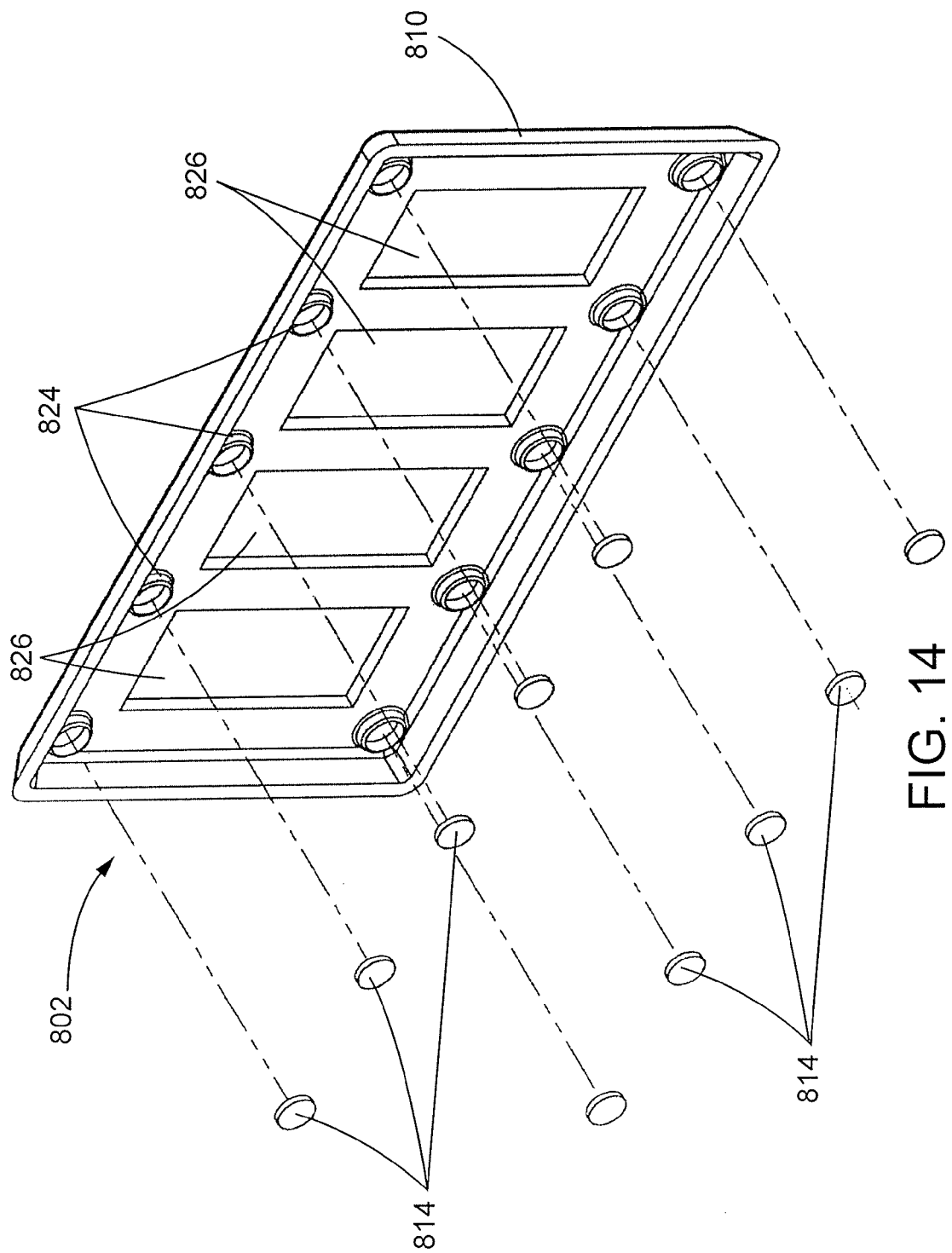
FIG. 14 is an exploded view of another alternative embodiment of an outer cover assembly in accordance with the disclosure.

FIG. 12 illustrates an embodiment of an outer cover assembly 602 that does not include an outer cover seal. The outer cover assembly 602 can include an outer cover 610 and a plurality of magnets 614. The outer cover 610 can have a rim 625 and a plurality of magnet retainers 624 that retain the magnets 614. The outer cover can also include an outer cover cavity 626 to accommodate portions of an implement. FIG. 13 illustrates another embodiment of an outer cover assembly 702 that does not include an outer cover seal. The outer cover assembly 702 can include an outer cover 710 and a plurality of magnets 714. The outer cover 710 can have a rim 725 and a plurality of magnet retainers 724 that retain the magnets 714. The outer cover can also includes two outer cover cavities 726 to accommodate portions of an implement. FIG. 14 illustrates yet another embodiment of an outer cover assembly 802 that does not include an outer cover seal. The outer cover assembly 802 can include an outer cover 810 and ten magnets 814. The outer cover 810 can have a rim 825 and ten magnet retainers 824 that retain the magnets 714. The outer cover can also include four outer cover cavities 826 to accommodate portions of an implement. In any of the embodiments illustrated in FIGS. 12-14, it is contemplated that any number of magnets, magnet retainers or outer cover cavities can be used to accommodate the particular implement being covered by the magnetic wall cover system.

Figure 16:
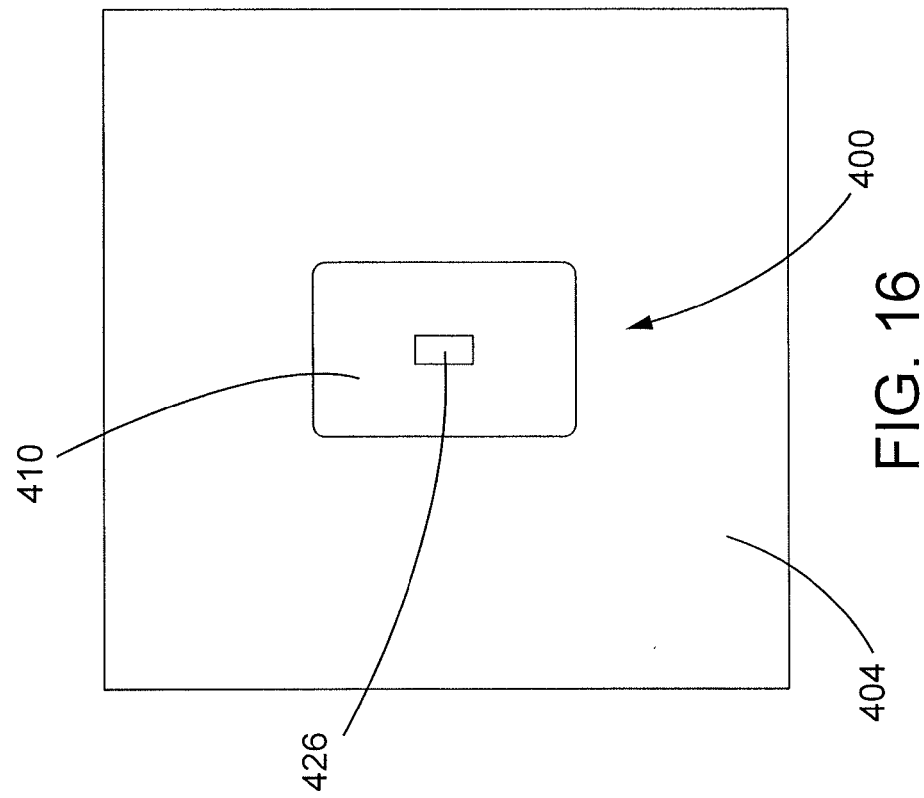
FIG. 16 is a front view of the magnetic wall cover system of FIG. 15 installed on a mounting surface.
Figure 15:
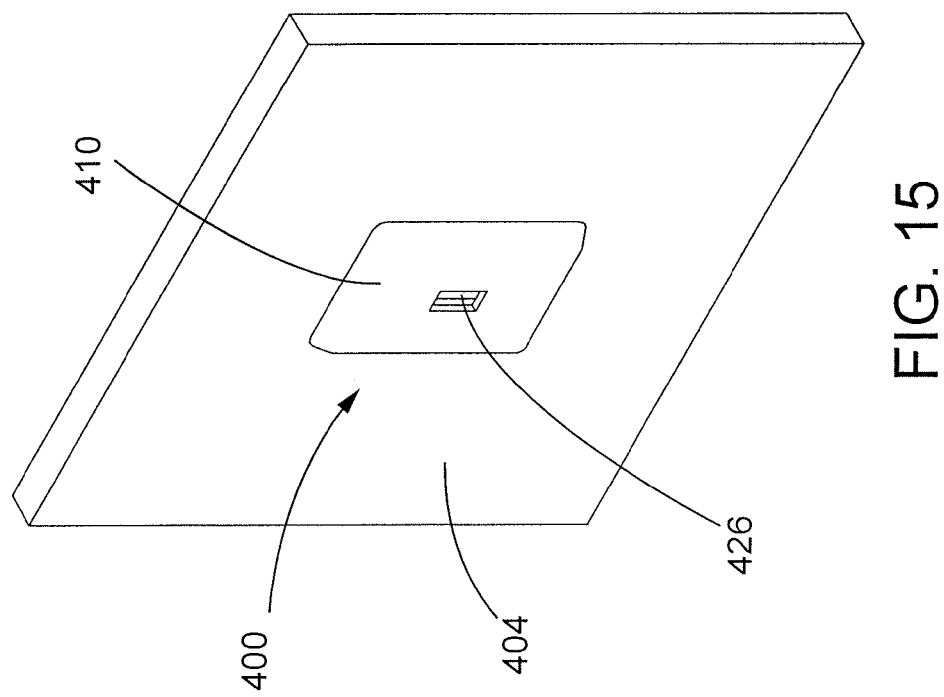
FIG. 15 is a perspective view of an embodiment of a magnetic wall cover system installed on a mounting surface in accordance with the disclosure.
Figure 18:
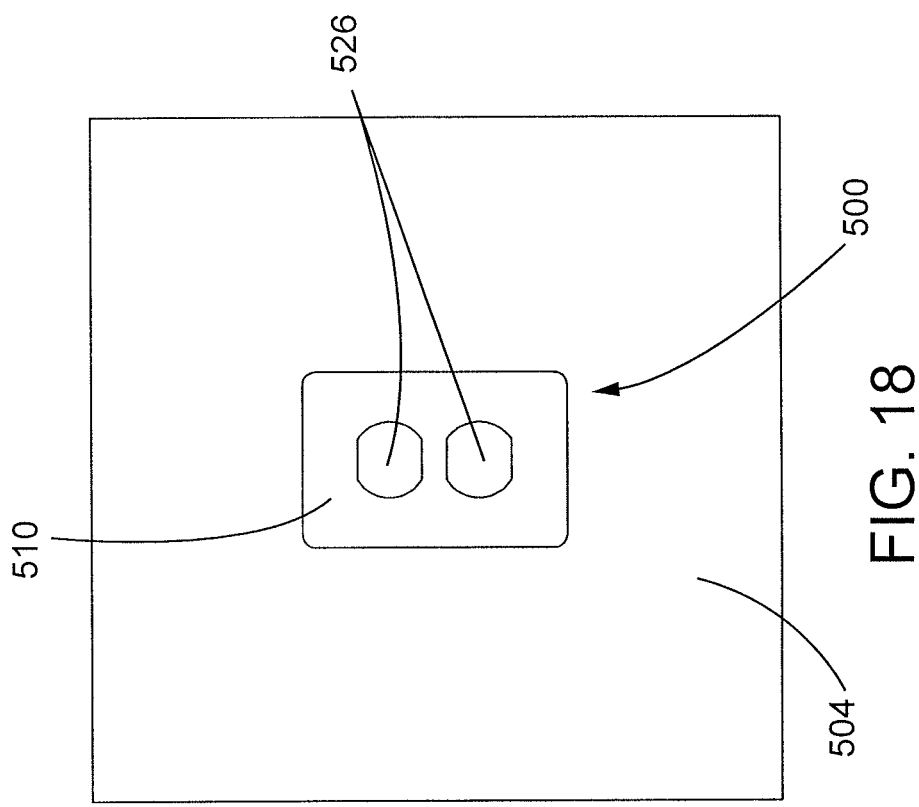
FIG. 18 is a front view of the magnetic wall cover system of FIG. 15 installed on a mounting surface.
Figure 17:
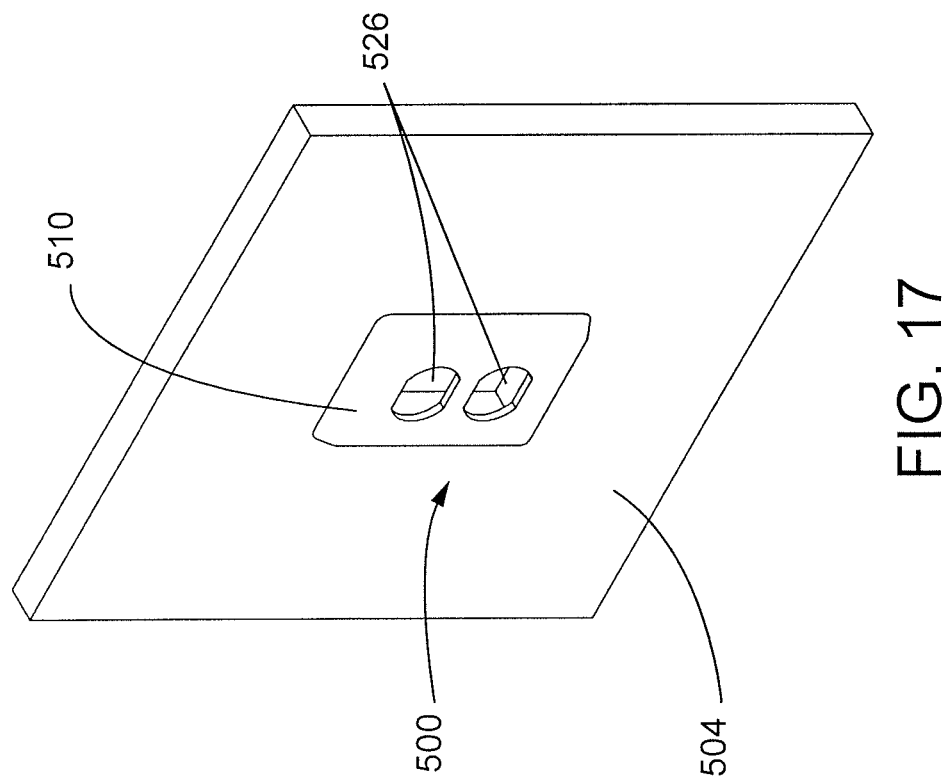
FIG. 17 is a perspective view of an embodiment of a magnetic wall cover system installed on a mounting surface in accordance with the disclosure.

FIGS. 15 and 16 illustrate another alternative embodiment of a magnetic wall cover system 400 that can be mounted on a wall 404 or other mounting surface. The illustrated embodiment can include an outer cover 410 and a relatively small outer cover cavity 426 compared to those illustrated in other figures. The smaller outer cover cavity 426 can accommodate a relatively small electrical switch or other implement. It is contemplated that the outer cover cavity or cavities in any embodiment can be of any size to accommodate any particular implement covered. FIGS. 17 and 18 illustrate yet another embodiment of a magnetic wall cover system 500 that can be mounted on a wall 504. The illustrated magnetic wall cover system 500 can include an outer cover 510 having two vertically aligned outer cover cavities 526 that can accommodate electrical outlets or any other type of implement to be covered.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A magnetic wall cover system comprising:
    an inner cover made at least partially of a ferrous material, the inner cover forming an inner cover implement cavity adapted to provide access to an implement having a protrusion;
    an outer cover that forms an outer cover implement cavity adapted to provide access to the implement, the outer cover removably mountable to the inner cover such that the protrusion of the implement can nest within an alignment recess adjacent the outer cover implement cavity when the outer cover is mounted over the inner cover, wherein the outer cover includes:
    a rim defining a perimeter of the outer cover,
    a seal channel recessed into the rim,
    an outer cover seal disposed on the rim and secured within the seal channel such that at least a portion of the outer cover seal protrudes over the rim,
    wherein the portion of the outer cover seal protrudes over the rim to engage with a mounting surface of the wall when the outer cover is mounted over the inner cover; and
    at least one magnet disposed on the outer cover, the at least one magnet forming a magnetic attraction between the magnet and the ferrous material of the inner cover.

2. The magnetic wall cover system of claim 1 wherein the alignment recess engages with a mounting bracket of the implement.

3. The magnetic wall cover system of claim 1 wherein the at least one magnet is coin-shaped.

4. The magnetic wall cover system of claim 1 wherein the at least one magnet is adhesively bonded to the outer cover.

5. The magnetic wall cover system of claim 1 wherein the outer cover is cast and includes an architectural design.

6. The magnetic wall cover system of claim 1 further comprising an inner cover seal disposed on the inner cover, the inner cover engaging with the mounting surface when the inner cover is mounted on the mounting surface of the wall.

7. The magnetic wall cover system of claim 1, wherein the at least one magnet is made from Neodymium.

8. The magnetic wall cover system of claim 1 further comprising a plurality of magnets substantially symmetrically disposed on the outer cover.

9. The magnetic wall cover system of claim 1 wherein the outer cover further comprises at least one magnet retainer adapted to retain the at least one magnet.

10. The magnetic wall cover system of claim 9 wherein the at least one magnet is disposed within the at least one magnet retainer.

11. The magnetic wall cover system of claim 9 wherein the at least one magnet retainer is integral with the outer cover.

12. The magnetic wall cover system of claim 9 wherein the at least one magnet retainer is adhesively bonded to the outer cover.

13. A method of using a magnetic wall cover system, the method comprising:
    providing an inner cover made at least partially of a ferrous material, the inner cover defining an outer alignment surface;
    providing an outer cover defining an inner alignment surface, the outer cover including:
    a rim defining a perimeter of the outer cover,
    a seal channel recessed into the rim,
    an outer cover seal disposed on the rim and secured within the seal channel such that at least a portion of the outer cover seal protrudes over the rim;
    connecting at least one magnet to the outer cover;
    mounting the inner cover to a mounting surface; and
    mounting the outer cover over the inner cover such that the outer alignment surface engages with the inner alignment surface, the portion of the outer cover seal that protrudes over the rim engages with the mounting surface of the wall, and a magnetic attraction is established between the ferrous portions of the inner cover and the at least one magnet.

14. The method of claim 13, wherein the magnets are made from Neodymium.

15. The method of claim 13, wherein the inner cover forms an implement cavity and the outer cover defines an alignment recess, the method further comprising:
    mounting the inner cover over an implement having a protrusion such that the protrusion protrudes through the implement cavity; and
    mounting the outer cover over the inner cover such that the alignment recess of the outer cover is in engaging relationship with the protrusion.

* * * * *